United States Patent [19]

Amano et al.

[11] Patent Number: 4,999,622

[45] Date of Patent: Mar. 12, 1991

[54] REMOTE COMMANDER HAVING A ROM READ-OUT PRE-PROGRAMMED CODES THEREFROM

[75] Inventors: Toshio Amano, Kanagawa; Akiko Shimada, Tokyo, both of Japan

[73] Assignee: Sony Corporation, Tokyo, Japan

[21] Appl. No.: 354,874

[22] Filed: May 22, 1989

[30] Foreign Application Priority Data

Jun. 28, 1988 [JP] Japan ................................ 63-159936

[51] Int. Cl.⁵ .......................................... H04B 10/00
[52] U.S. Cl. ............................. 340/825.720; 341/176; 358/194.100
[58] Field of Search ...................... 340/825.72, 825.69, 340/825.56; 341/176; 358/194.1; 455/151, 352, 353, 603

[56] References Cited

U.S. PATENT DOCUMENTS

| | | | |
|---|---|---|---|
| 4,626,848 | 12/1986 | Ehlers | 340/825.72 |
| 4,703,359 | 10/1987 | Rumbolt et al. | 340/825.72 |
| 4,728,949 | 3/1988 | Platte et al. | 340/825.69 |
| 4,771,283 | 9/1988 | Imoto | 340/825.72 |
| 4,774,511 | 9/1988 | Rumbolt et al. | 340/825.69 |
| 4,825,200 | 4/1989 | Evans et al. | 340/825.72 |
| 4,857,898 | 8/1989 | Smith | 340/825.69 |
| 4,866,434 | 9/1989 | Keenan | 340/825.69 |

Primary Examiner—Donald J. Yusko
Assistant Examiner—Dervis Magistre
Attorney, Agent, or Firm—Lewis H. Eslinger

[57] ABSTRACT

A multi-commander includes a first memory for storing a plurality of remote control signals having different signal formats, a circuit for receiving a remote control signal from another remote commander, a rewritable second memory, a remote control signal transmitting circuit for transmitting a remote control signal derived from the first memory, and a mode switch for selectively switching between the setting mode and the remote control mode. When the mode switch is in the setting mode, the signal format of the remote control signal derived from the other remote commander and received by the remote control signal receiving circuit is identified and the signal format of the remote control signal from the other remote commander is read out of the first memory and is then written in the second memory. When the mode switch is in the remote control mode, the signal format written in the second memory is supplied to the remote control signal transmitting circuit in order to control a selected one of a plurality of electronic devices.

4 Claims, 4 Drawing Sheets

REMOTE COMMANDER HAVING A ROM READ-OUT PRE-PROGRAMMED CODES THEREFROM

BACKGROUND OF THE INVENTION

1. Field of the Invention

This invention relates to remote commanders and, more particularly, to a novel and highly-effective general-purpose remote commander (remote control apparatus) that is suitable for remotely controlling the operation of a plurality of electronic devices such as a television receiver, a videotape recorder and the like.

2. Description of the Prior Art

Video apparatus such as a television receiver, a videotape recorder and so on have come into wide use. Most such devices are provided with a so-called remote controller or a remote commander using infrared rays or the like so that they can be remotely controlled by the user.

The problem is then presented that a plurality of such devices cannot be remotely controlled without their own remote commanders, so the user may be uncertain or confused as to which remote commander to choose for controlling a particular electronic device. Further, remote commanders have to be operated individually in their own ways and this is very cumbersome for the user. In fact, some users cannot adequately learn how to operate so many remote commanders. Therefore, it is desirable that a single remote commander (hereinafter simply referred to as a multi-commander) be designed to be capable of remotely controlling a plurality of electronic devices. Such multi-commanders are very useful in practice. By way of example, videotape recorders produced by different manufacturers are designed to have different signal systems such as a signal waveform (number of bits per word, pulse width, modulation frequency for each pulse, etc.) of a remote control signal and a fundamental format (recursive number of a signal waveform, etc.) that cause, for example, the videotape recorder to effect the recording. Also, frequently different videotape recorders, though produced by the same manufacturer, have different signal systems because they are different in type and product type number.

A multi-commander must not only sell at a reasonable price but also have a proper size and generate remote control signals compatible with various signal systems. Conventional multi-commanders are generally either of a learn-type or of a pre-programmed type, as the following table shows.

TABLE 1

| Classification of conventional multi-commanders | | |
|---|---|---|
| Class | Sub-Class | Contents |
| Learn-system | | Nothing stored in initial setting state→Supply transmission signals of respective commanders to multi-commander in which signal waveforms thereof are stored→Reproduce and transmit signal waveforms corresponding to respective operation keys |
| Pre-programmed-system | Selection-type | Store waveforms of transmission signals of all manufactures→Select manufacturer in accordance with category of apparatus by set switch→Transmit signal waveform of selected manufacturer corresponding to each key |
| | Search-type | Store waveforms of transmission signals of all manufactures→Output transmission signal waveforms in a time-series manner and store manufacturer code having signal waveform that actuates apparatus→Output signal waveform of selected manufacturer corresponding to each key |

A multi-commander of learn-type is disclosed, for example, in official gazettes of Japanese Laid-open Pat. Appln. Nos. 60-254898 and 61-23499. The pre-programmed type multi-commander is further classified into a selection-type and a search-type. The selection-type multi-commander is disclosed, for example, in official gazette of Japanese Laid-open Pat. Appln. No. 62-23700 and the search-type multi-commander is disclosed, for example, in official gazette of Japanese Laid-open Pat. Appln. No. 62-126800.

The learn-type multi-commander is designed, in the learn-type mode, to receive remote-control signal waveforms from other remote commanders and to store the signal waveforms of the remote control signals (in some cases with timebase compression of the received signal, etc.), while in the normal mode it reconstructs the stored signal waveforms in response to the key input from the pressed key and supplies the reconstructed signal waveforms as an output. This learn-type multi-commander will hereinafter be described with reference to FIG. 1.

FIG. 1 is a pictorial representation of a prior-art learn-type multi-commander that is generally designated by reference numeral 1. As FIG. 1 shows, the learn-type multi-commander 1 comprises a mode switch 2 used to select the learn mode and the normal mode, a light emitting diode (LED) 3 used to generate a signal superimposed upon infrared rays, a light receiving element 4 used to receive infrared rays from the commanders for the video apparatus, a random access memory (RAM) 5 used to store the signal waveforms of remote control signals, a liquid crystal display panel (LCD panel) 6 used in the learn mode, and operation keys 7.

When signal waveforms of remote control signals from, for example, a television receiver commander (hereinafter simply referred to as a TV commander) 8 and a videotape recorder commander (hereinafter simply referred to as a VTR commander) 10 are stored in the multi-commander 1, the mode switch 2 is connected to the L-side (learn-mode side) contact and the light-emitting portion of the TV commander 8 is placed near the front of the light receiving element 4 of the multi-commander 1. Then, the operation keys 9 of the TV commander 8 are respectively pressed down in accordance with the order of key operations displayed on the liquid crystal display panel 6. In the same way, the light emitting portion of the VTR commander 10 is placed near the front of the light receiving element 4 of the multi-commander 1 and operation keys 11 of the VTR commander 10 are respectively pressed down in accordance with the order of key operations displayed on the liquid crystal display panel 6. When the remote-control signals corresponding to all operation keys of the two commanders 8 and 10 are written in the RAM 5 and the mode switch 2 is connected to the U-side contact (usual-mode side contact), if the respective operation keys 7 of the multi-commander 1 are depressed, the corresponding remote-control signals are read out of the random access memory 5 and are emitted from the light emitting diode 3 to the TV or to the VTR in a form superimposed upon the infared rays.

FIG. 2 pictorially illustrates a selection-type multi-commander 12 according to the prior-art pre-programmed system. As FIG. 2 shows, the selection-type multi-commander 12 includes a read only memory (ROM) 13 in which there are previously stored remote-control signals of, for example, television receivers and videotape recorders of all manufacturers. In the initial setting state, if the television receiver is the product made by manufacturer A, a 5-bit code (for example, 11011) of manufacturer A is a set by a mechanical switch 14. Similarly, a 5-bit code (for example, 01001) of a manufacture who makes a videotape recorder is set by a mechanical switch 15. When any one of operation keys 16 of the multi-commander 12 is pressed down, if the operation key corresponds to the TV operation, the multi-commander 12 reads the code set by the switch 14 and reads the signal waveform of manufacturer A corresponding to the operated key from the read only memory 13 and transmits the read-out signal waveform by means of the light emitting diode 3.

The search-type prior-art pre-programmed multi-commanders include, as in the example of FIG. 2, a read only memory in which there are previously stored control signals of a plurality of apparatus to be controlled and made by all manufacturers. In the initial setting state, a control signal of a specific manufacturer is selected from the above-mentioned control signals, as shown in FIG. 3, at a time $t=t_0$, for example, by operating mute key and channel-up key. Control signals of all manufacturers (for example, manufacturers A to Z) are then sequentially supplied as outputs to the apparatus to be controlled in a time-series manner. When the channel of the apparatus to be controlled changes (for example, at time $t=t_1$), the multi-commander understands that the apparatus to be controlled is the product of manufacturer E and the pressed-down keys are released.. The remote-control code of manufacturer E is then written in the random access memory. Thereafter, the multi-commander reads the signal waveform of manufacturer E from the read only memory and transmits it as a signal that operates the apparatus.

The signal format of the remote-control signal will be described with reference to FIG. 3. As that figure shows, the control signal of, for example, manufacturer A is formed of a digital signal of 32 bits; the control signal of manufacture B is formed of a signal having a constant frequency which differs in each operation; the control signal of manufacturer C is formed of a single or double-burst signal of a fixed bit time; the control signal of manufacturer D is formed of a digital signal of 24 bits; and the control signal of manufacturer E is formed of a guide pulse $E_0$, a category code $E_1$ (a code representing the kind of apparatus such as television receiver or videotape recorder) of 5 bits and a command code $E_2$ of 7 bits.

Of the above-mentioned prior-art multi-commanders, the learn-type multi-commander 1 shown in FIG. 1 must store the control signals corresponding to all operation keys of the respective commanders 8 and 10 in the random access memory 5 and needs a long period of time for storing the waveforms. Further, the learn-type multi-commander 1 needs the liquid crystal display panel 6 for indicating the storing order of control signals and the random access memory 5 of large capacity in which the waveforms can be stored, thus resulting in a manufacturing cost that is substantially increased.

Of the pre-programmed type multi-commanders, the selection-type multi-commander shown in FIG. 2 entails the risk that in the initial setting state, the user will operate the switches 14 and 15 erroneously. The number of setting switches must be increased in proportion to the kinds of the apparatus to be remotely controlled, thus making it difficult to expand the capacity of the multi-commander.

Further, the search-type multi-commander needs a long time to supply as outputs the control signals of all manufacturers (about 40 manufacturers at present) and will require still more time for this purpose if the number of manufacturers whose control signals are to be stored in the ROM increases; and, if an error occurs in the time at which the operation keys are released after the apparatus to be controlled begins to operate, there is then the problem that the control signal of the wrong manufacturer is supplied as an output. Thus, the correct setting cannot be achieved.

OBJECTS AND SUMMARY OF THE INVENTION

An object of the present invention is to provide an improved multi-commander having a read only memory for reading out pre-programmed codes therefrom.

Another object of the present invention is to provide a multi-commander having a read only memory for reading out pre-programmed codes therefrom that can control a plurality of electronic devices such as a videotape recorder, a television receiver or the like.

Another object of the present invention is to provide a multi-commander having a read only memory for reading out pre-programmed codes therefrom that is simplified in construction.

Other objects of the invention are:

To provide a multi-commander that is easily expandable in capacity; and

To provide a multi-commander that can be actuated in a short period of time and with high accuracy.

In accordance with an aspect of the present invention, there is provided a multi-commander comprising: a first memory for storing a plurality of remote control signals having different signal formats; remote control signal receiving means for receiving a remote control signal from another remote commander; a second rewritable memory; remote control signal transmitting means for transmitting a remote control signal from said first memory; and mode switch means for selectively switching between a setting mode and a remote control mode; wherein, when said mode switch means is in the setting mode, the signal format of the remote control signal derived from said other remote commander and received by said remote control signal receiving means is identified and the signal format of said remote control signal from the other remote commander is read out of said first memory and is written in said second memory.

In accordance with an independent aspect of the invention, there is provided a multi-commander comprising: a first memory for storing a plurality of remote control signals having different signal formats; remote control signal receiving means for receiving a remote control signal from another remote commander; a second rewritable memory; remote control signal transmitting means for transmitting a remote control signal from said first memory; and mode switch means for selectively switching between a setting mode and a remote control mode; wherein, when said mode switch means is in the setting mode, the signal format of the remote control signal derived from said other remote commander and received by said remote control signal receiving means is identified and the signal format of said remote control signal from the other remote commander is read out of said first memory and is written in said second memory; and wherein, when said mode switch means is in the remote control mode, said signal format is read out of said second memory and the corresponding control signal is read out of said first memory for transmission by said signal transmitting means.

DETAILED DESCRIPTION OF THE PREFERRED EMBODIMENT

An embodiment of a multi-commander according to the present invention is described below with reference to FIGS. 4 to 6. In this embodiment, the present invention is applied to a multi-commander that can control the operations of a television receiver and a videotape recorder by a single multi-commander by means of infrared rays. The multi-commander of the present embodiment can be distributed in the form of a remote commander itself as well as an accessory for specific apparatus.

Figure 4:
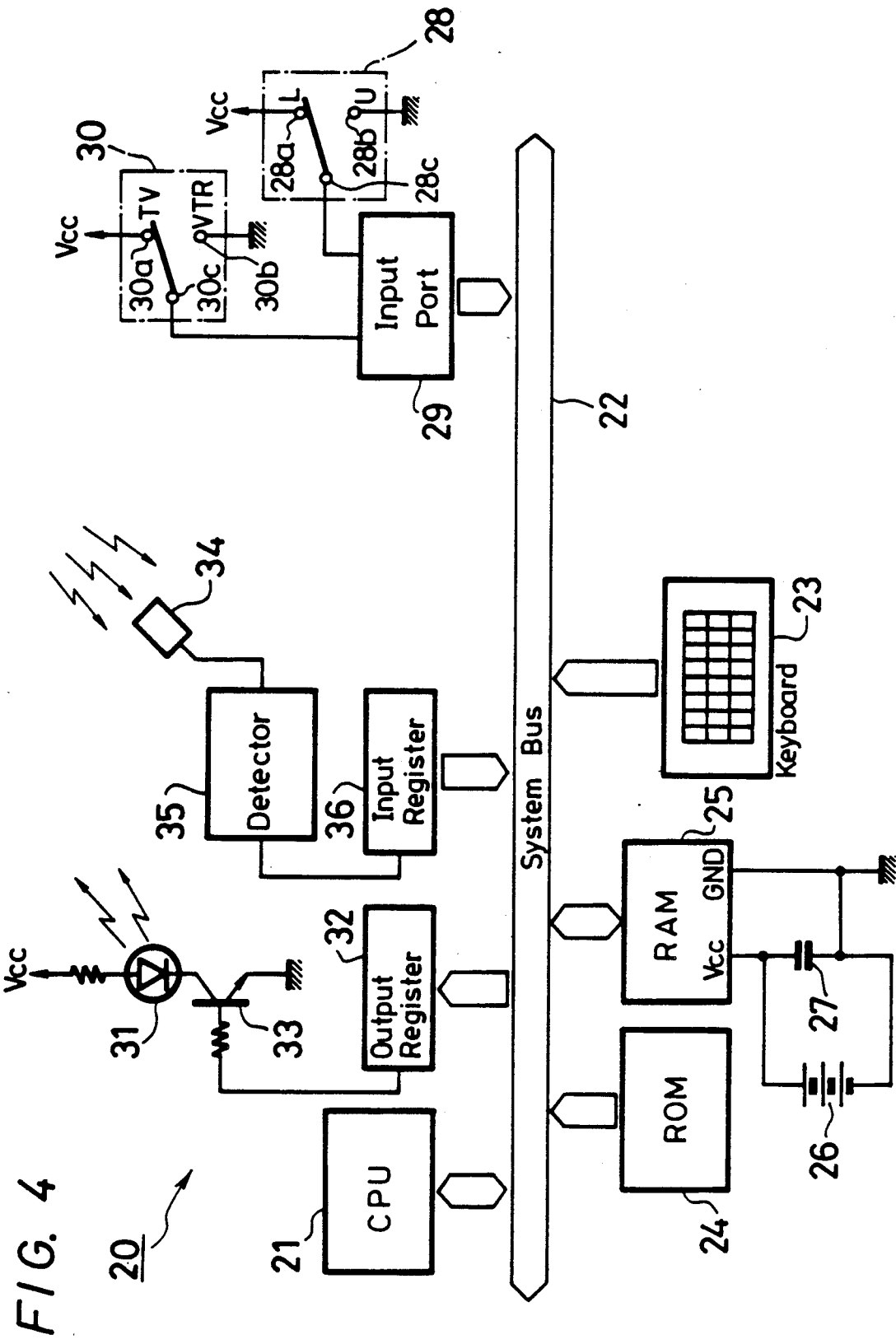
FIG. 4 is a block diagram showing an embodiment of a multi-commander according to the present invention.

A block diagram forming FIG. 4 illustrates an embodiment of a multi-commander 20 according to the present invention.

As FIG. 4 shows, a central processing unit (CPU) 21 is connected to a system bus 22 to control the overall operation of the multi-commander 20. A keyboard 23 operable by the user is also connected to the system bus 22. A non-volatile memory (or read only memory) 24 is provided, from which the data is read out only. During the manufacturing process, remote control signals corresponding to the respective operations of television receivers made by all existing manufacturers and remote control signals corresponding to the respective operations of videotape recorders made by all existing manufacturers are stored in the read only memory 24. There is provided a random access memory (RAM) 25 of a CMOS (complementary metal oxide semiconductor) structure that is capable of writing and reading at any time. Between a voltage input terminal Vcc and a ground terminal GND of the random access memory 25, a battery 26 and a back-up capacitor 27 are connected so that the content of the RAM 25 can be maintained during a period in which the battery 26 is exchanged.

As FIG. 4 shows, the multi-commander 20 is provided with manually-switchable mode switch 28. A positive direct current voltage Vcc is applied to one fixed contact 28a of the mode switch 28 and the other fixed contact 28a is grounded. A movable contact 28c of the mode switch 28 is connected to an input port 29, whereby when the movable contact 28c is connected to the fixed contact 28a, setting mode is indicated, while when the movable contact 28c is connected to the other fixed contact 28b, usual mode (remote control mode) is indicated.

The multi-commander is also provided with a category switch 30 that can be manually switched. One fixed contact 30a, the other fixed contact 30b and the movable contact 30c of the category switch 30 are connected to the positive direct current source Vcc, the ground and the input port 29, respectively. When the movable contact 30c of the category switch 30 is connected to its fixed contact 30a, the television receiver is designated as the apparatus to be controlled, while when the movable contact 30c is connected to the fixed contact 30b, the videotape recorder is designated as the apparatus to be controlled. The conditions of the mode switch 28 and the category switch 30 can be ascertained by the CPU 21 through the input port 29 and the system bus 22.

A light emitting diode (LED) 31 emits infrared rays on which the remote-control signal is superimposed. The light emitting condition of the light emitting diode 31 is controlled through an output register 32 and a transistor 33. Reference numeral 34 designates a light receiving element such as a photo-transistor or the like. The light receiving element 34 converts infrared rays of the TV commander and the VTR commander into an electrical signal. The thus converted electrical signal is supplied to the central processing unit 21 through a detecting circuit 35 and an input register 36.

Figure 5:
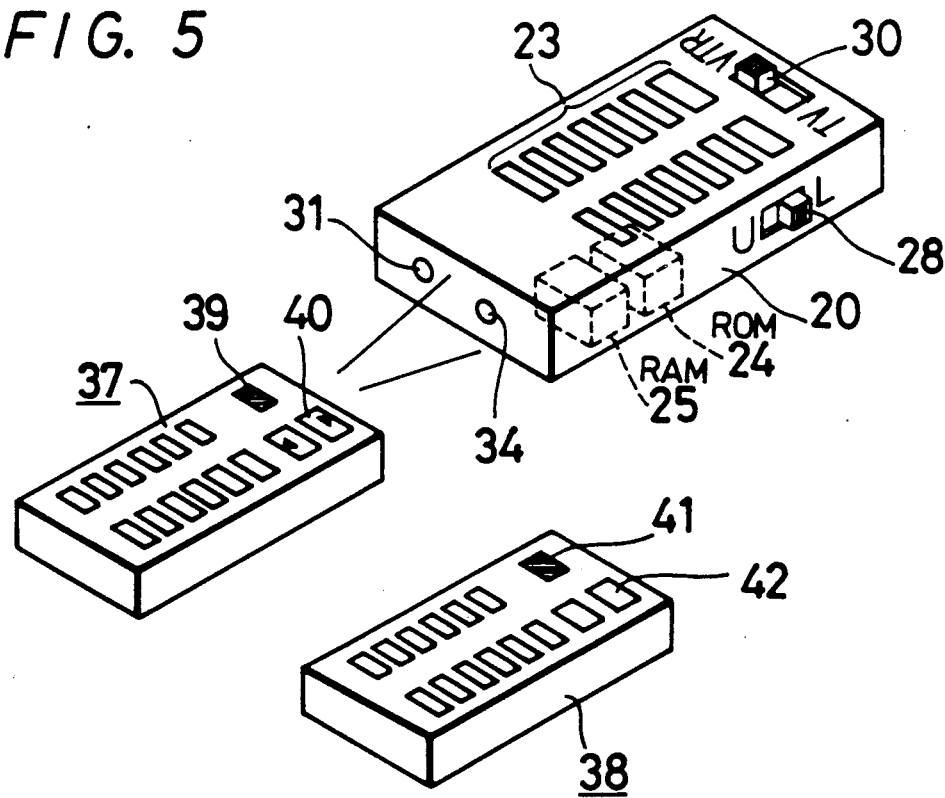
FIG. 5 is a pictorial, perspective view illustrating the initial setting state of the embodiment of the present invention shown in FIG. 4.

In order to determine which manufacturer's control signal (of the control signals stored in the read only memory 24 of the multi-commander 20 of the present embodiment) should be used with respect to the television receiver and the videotape recorder (or to carry out initial setting), a TV commander 37 of the television receiver and the VTR commander 38 of the videotape recorder are prepared and the user manually switches the mode switch 28 of the multi-commander 20 to the L-side to select [setting mode], as shown in FIG. 5. The operation of the multi-commander 20 in the initial setting state will be described with reference to a flow chart of FIG. 6.

Figure 6:
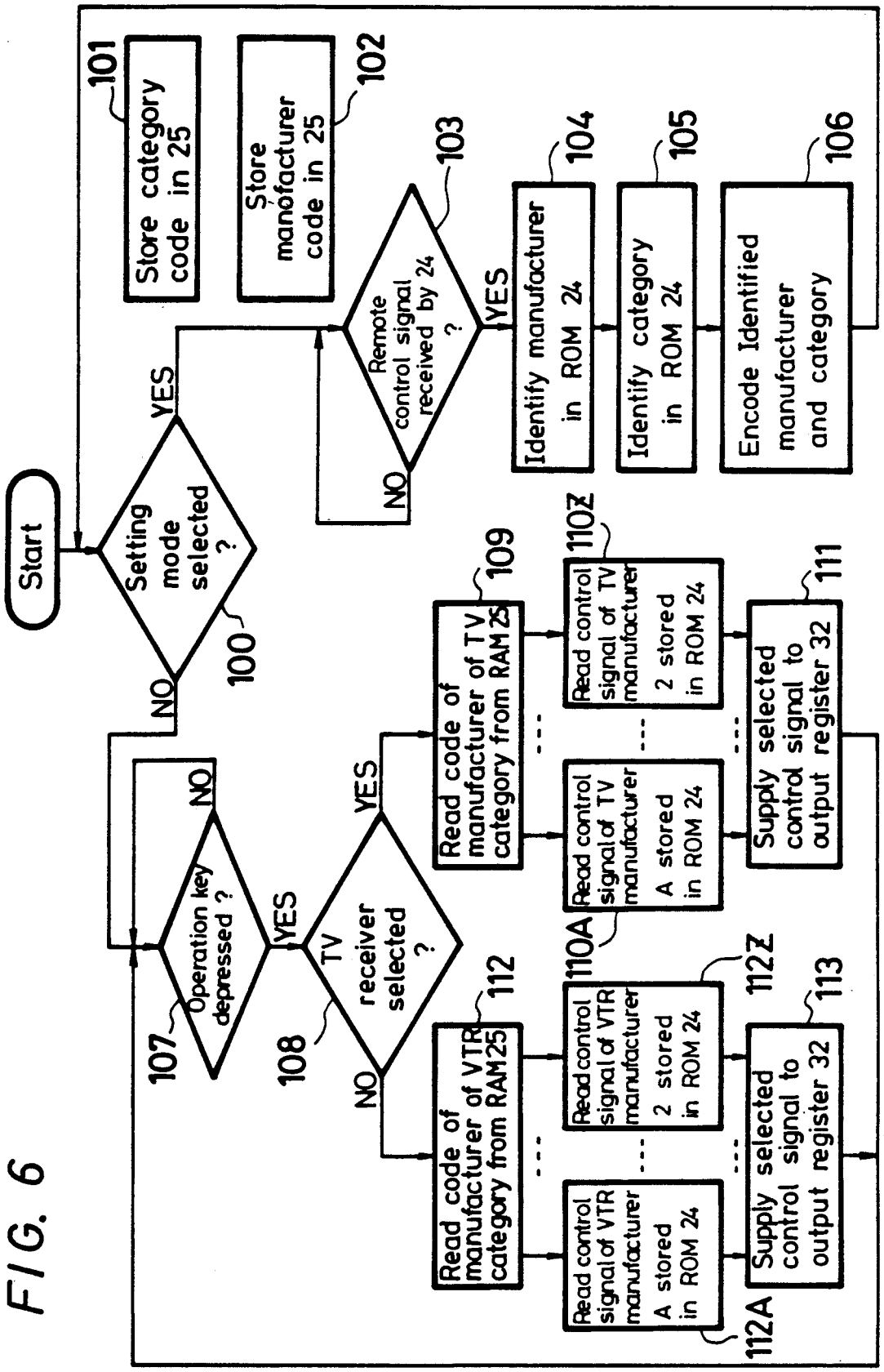
FIG. 6 is a flow chart to which reference will be made in explaining the operation of the multi-commander shown in FIG. 4.

In FIG. 6, it is determined at step 100 by the central processing unit 21 in the multi-commander 20 whether the movable contact 28c of the mode switch 28 is connected to the setting mode side (fixed contact 28a) or to the usual mode) side (fixed contact 28b). Since the mode switch 28 is connected to the fixed contact 28a (in the setting mode), the routine proceeds to the next decision step 103, wherein it is determined whether or not the remote-control signal is supplied to the light receiving element 34. The program remains at step 103 until a yes answer is obtained. In order to obtain a yes answer, the operator (user) places the light emitting portion of the TV commander 37 toward the front of the light receiving element 34 of the multi-commander 20 and depresses a power key 39 of the TV commander 37. Thereupon, the operation of the multi-commander 20 proceeds to steps 104 to 106, wherein the manufacturer and the category (TV or VTR) of the apparatus to be controlled are identified by the code pattern of the control signal corresponding to [switch-ON operation].

More specifically, the input control signal is compared with the control signals of the respective manufacturers of TV and VTR apparatus corresponding to the [switch-ON] operation stored in the read only memory 24. If the signal waveforms become identical, the category and the manufacturer which present the signal systems of the control signals are encoded and written in the random access memory 25 at steps 106, 106A, 106B, respectively. Then, the routine returns from step 106 to step 100. Then, when the operator places the light emitting portion of the VTR commander 38 toward the front of the light receiving element 34 of the multi-commander 20 and depresses the power key 41, the code of the videotape recorder as a category and the code of the corresponding manufacturer are encoded and written in the random access memory 25 again at steps 106, 106A, and 106B.

While in this embodiment the category and the manufacture are identified on the basis of the control signals corresponding to the power keys 39 and 41 of the TV and VTR commanders 37 and 38, the channel-up key 40 or the like may be utilized if the commander is, for example, the TV commander 37 and the playback key 42 or the like may be used if the commander is, for example, the VTR commander 38. While the kind of key to be operated for each category is predetermined and is stored in the operation manual of the multi-commander 20 or the like, a particular key is not previously determined but the input signal waveform may be sequentially compared with all remote control signals stored in the read only memory 24.

In order to remotely control the television receiver and the videotape recorder by using the multi-commander 20 in this embodiment, the mode switch 28 is switched to the fixed contact 28a (the U-side) and the usual mode is thereby selected. Then, the category switch 30 is connected to the fixed contact 30a (the TV side) or to the fixed contact 30b (the VTR side) in response to the apparatus to be controlled. If any key in the operation keys 23 (which do not select the setting mode) of the multi-commander 20 is pressed down, the operation of the multi-commander 20 proceeds to step 100, step 107 and step 108 in that order. In step 108, the central processing unit 21 in the multi-commander 20 reads the condition of the category switch 30. If the television receiver is selected, the routine proceeds to step 109, wherein the code of the manufacturer of the TV category is read out of the random access memory 25. If the manufacturers indicated by the codes are manufacturers A, . . . Z, the central processing unit 21 reads the control signals of manufacturers A, . . . Z corresponding to the operated keys from the read only memory 24 (steps 110A to 110Z) and supplies the control signals to the output register 32 (in step 111). Thus, the light emitting diode 31 transmits the infrared ray superimposed with the remote-control signal corresponding to the operation key 23 to the television receiver.

If the category switch 30 is connected to the fixed contact 30b (the VTR-side) as represented by a NO at step 108, the routine proceeds to step 112, wherein similarly to the case in which the category switch 30 is connected to the fixed contact 30a (the TV-side), the code of the manufacturer of the VTR category is read out of the random access memory 25 and the control signal of the manufacturer corresponding to the operated key 23 is read out of the read only memory 24 and is fed to the output register 32 at step 113.

Figure 1:
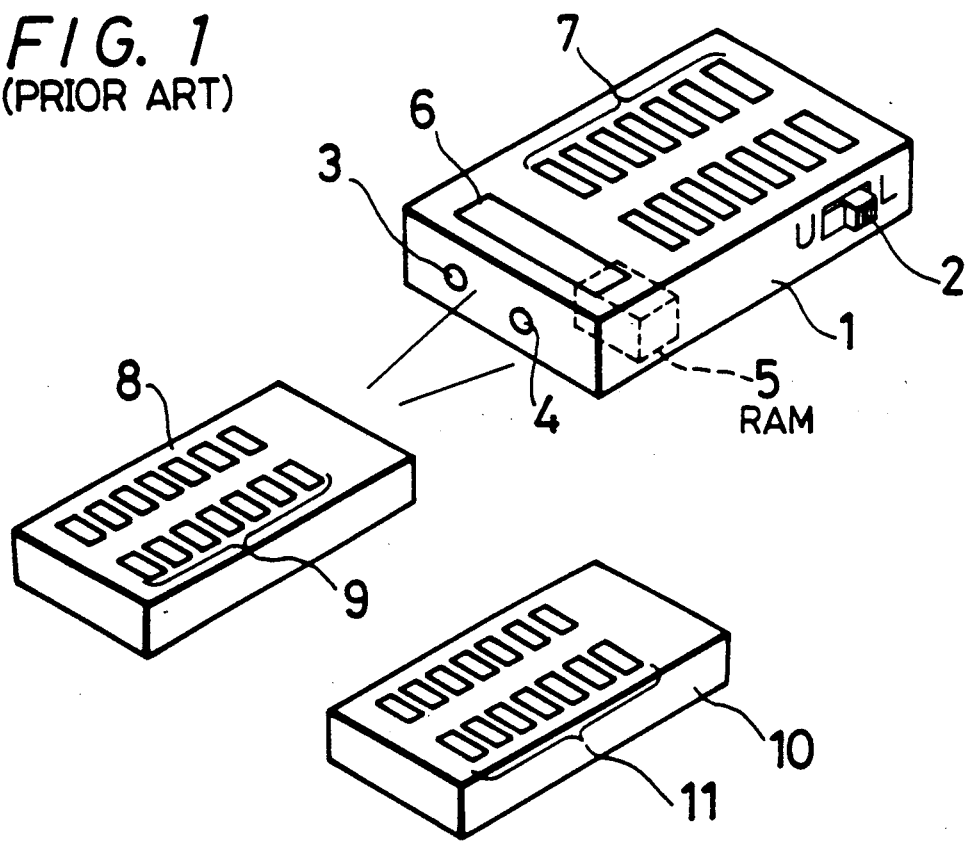
FIG. 1 is a pictorial representation of a learn-type multi-commander according to the prior art.

In this embodiment, since the multi-commander 20 is provided with the read only memory 24 which stores the control signals of a plurality of manufacturers of the respective categories in advance and the initial setting is carried out by operating, for example, the power keys 39 and 41 of the respective commanders 37 and 38 as described above, the expensive rewritable random access memory 5 of large capacity provided in the prior-art learn-type multi-commander 1 (FIG. 1) and the liquid crystal display panel 6 that indicates the procedure of the initial setting are not needed, thereby decreasing the manufacturing cost.

Further, since the initial setting of the multi-commander 20 is executed only by operating, for example, the power keys 39 and 41 of the respective commanders 37 and 38, the multi-commander 20 of the present embodiment can perform the initial setting in a very short period of time and with high accuracy as compared with the prior-art multi-commander of the pre-programmed type.

Figure 2:
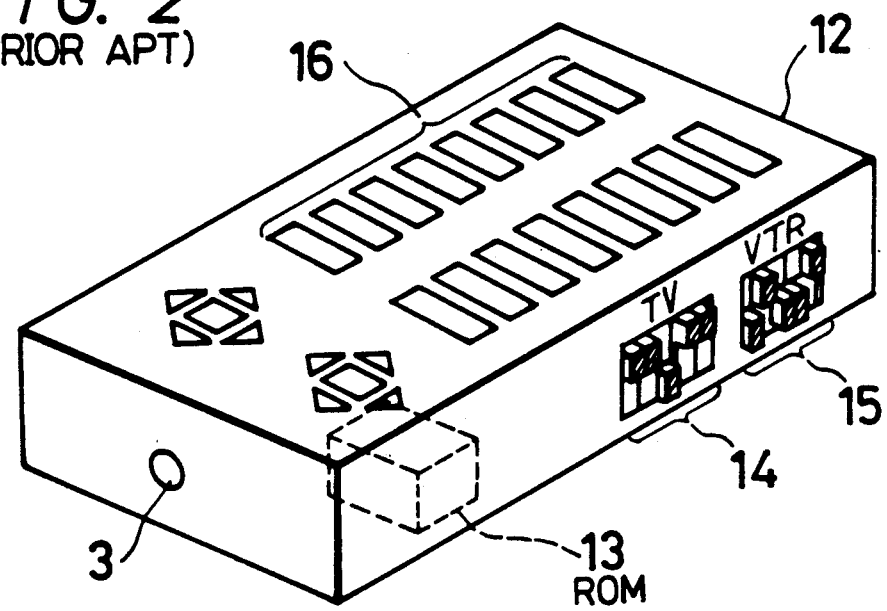
FIG. 2 is a pictorial representation of a selection-type multi-commander according to the prior art.
Figure 3:
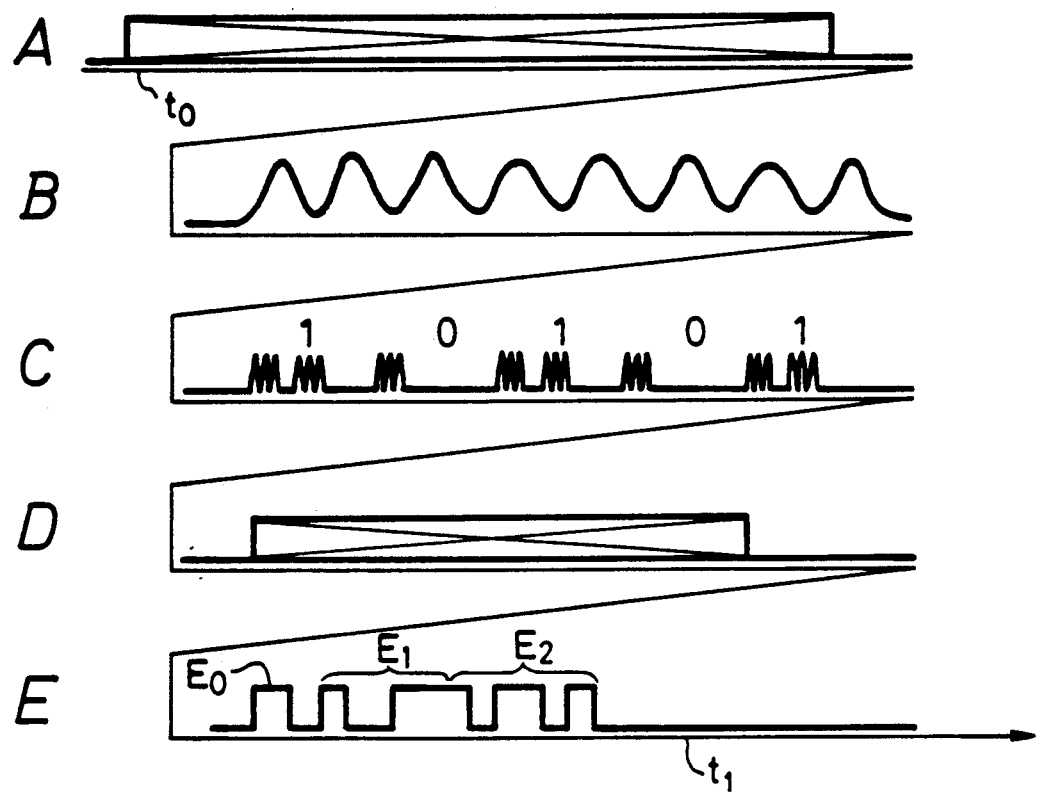
FIG. 3 is a schematic diagram showing output signals of a prior-art search-type multi-commander.

Furthermore, the setting switches 14 and 15 corresponding to the respective categories of the prior-art selection-type multi-commander 12 (FIG. 2) may be removed so that even if the number of categories of apparatus to be controlled by a single multi-commander is increased, the present invention can be suitably applied to the above-mentioned case.

While in the above-mentioned embodiment the [setting mode] and the [usual mode] are selected by using the mode switch 28, if a specific key of the operation keys 23 is selected as a mode selection key instead of the mode switch 28 and the [setting mode] is selected, the light emitting diode for indicating the mode may be flashed. Similarly, it will be apparent that the category switch 30 may be replaced with the key operation.

While in the above-mentioned embodiment the remote control signal is superimposed upon the infrared rays and is then transmitted, the remote control signal may be superimposed upon ultrasonic waves and FM (frequency-modulated) waves.

As set out above, since the multi-commander of the present invention is provided with the memory in which the remote control signals having different signal systems are stored in advance and the initial setting thereof is executed by executing the key operation of, for example, the remote commander of the apparatus to be controlled, the manufacturing cost of the multi-commander can be reduced, the multi-commander of the invention can easily have its capacity expanded and the initial setting can be executed in a short period of time and with high accuracy.

It should be understood that the description set out above of a single preferred embodiment of the invention is merely exemplary; many modifications and variations thereof can be effected by one having ordinary skill in the art without departing from the spirit and scope of the novel concepts of the invention so that the scope of the invention should be determined only by the appended claims.

We claim:

1. A multi-commander comprising:
   a read only memory having stored therein in advance of the time of manufacturer of the multi-commander a plurality of remote control signals having different signal formats and including a manufacturer's code for each of a plurality of manufacturers;

remote control signal receiving means for receiving a remote control signal from an other remote commander, said remote control signal including a manufacturer's code identifying the manufacturer of said other remote commander;

a random access memory;

remote control signal transmitting means for transmitting a remote control signal from said read only memory; and mode switch means for selectively switching between a setting mode and a remote control mode;

wherein, when said mode switch means is in the setting mode, the manufacturer's code included in the remote control signal derived from said other remote commander and received by said remote control signal receiving means is written in said random access memory and compared with said manufacturer's codes for each of the plurality of manufacturer's stored in said read only memory for identifying the manufacturer, so that the signal format of said remote control signal from the other remote commander is read out of said read only memory and is written in said random access memory; and wherein, when said mode switch means is in the remote control mode, the signal format written in the random access memory is employed to select appropriate remote control signals from said read only memory for transmission by said signal transmitting means.

2. A multi-commander according to claim 1, further comprising category switch means for selecting a category of apparatus to be remotely controlled.

3. A multi-commander according to claim 1, in which said remote control signal transmitting means is a light emitting diode.

4. A multi-commander comprising:

a first memory arranged for read-out only and having stored therein in advance of the time of manufacture of the multi-commander a plurality of remote control signals having different signal formats and manufacutrer's codes respectively proper to different apparatus of different manufacturers;

remote control signal receiving means for receiving a remote control signal from an other remote commander proper to a particular apparatus of a particular manufacturer;

a second writable memory arranged for random access;

remote control signal transmitting means including an output register for transmitting a remote control signal from said first memory through said output register for controlling a given function of said particular apparatus; and mode switch means for selectively switching between a setting mode and a remote control mode;

wherein, when said mode switch means is in the setting mode, the manufacturer's code included in the remote control signal derived from said other remote commander and received by said remote control signal receiving means is written in said second memory and compared with said manufacturer's codes for said different manufacturers stored in said first memory for identifying the manufacturer, so that the signal format of said remote control signal from the other remote commander is read out of said first memory and is written in said second memory; and wherein, when said mode switching means is in the remote control mode, said signal format is read out of said second memory and employed for selecting an appropriate control signal to be read out of said first memory for transmission by said signal transmitting means to said particular apparatus for controlling said given function.

* * * * *